R. L. MORGAN.
DEMOUNTABLE RIM FOR VEHICLE TIRES.
APPLICATION FILED JUNE 3, 1916.

1,299,205.

Patented Apr. 1, 1919.

Inventor
Ralph L. Morgan.
By Geo. H. Kennedy
Attorney

UNITED STATES PATENT OFFICE.

RALPH L. MORGAN, OF WORCESTER, MASSACHUSETTS.

DEMOUNTABLE RIM FOR VEHICLE-TIRES.

1,299,205.  Specification of Letters Patent. Patented Apr. 1, 1919.

Application filed June 3, 1916. Serial No. 101,611.

*To all whom it may concern:*

Be it known that I, RALPH L. MORGAN, a citizen of the United States, residing at Worcester, in the county of Worcester and Commonwealth of Massachusetts, have invented a new and useful Improvement in Demountable Rims for Vehicle-Tires, of which the following is a specification, accompanied by drawings forming a part of the same.

The object of my present invention is to produce a demountable rim for vehicle tires by which the construction of this class of tires is simplified by the reduction of its detachable parts, thereby rendering its application to and removal from a wheel rim less complicated. These objects, among others, I accomplish by the construction and arrangement of parts as hereinafter described, reference being had to the accompanying drawings, in which—

Similar reference characters refer to similar parts throughout the different views.

Figure 1:
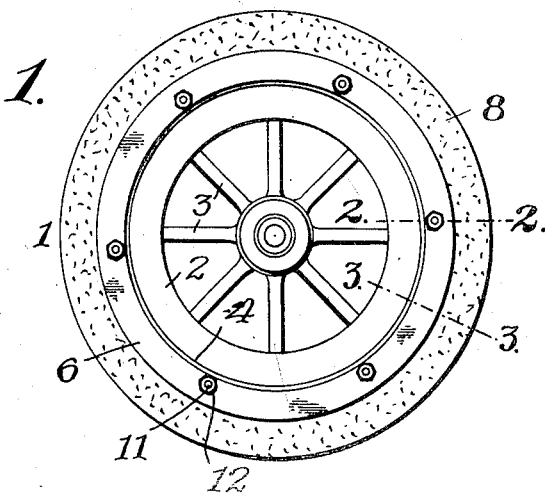
Figure 1 represents a side view of a vehicle wheel fitted with my improved demountable rim.
Figure 2:
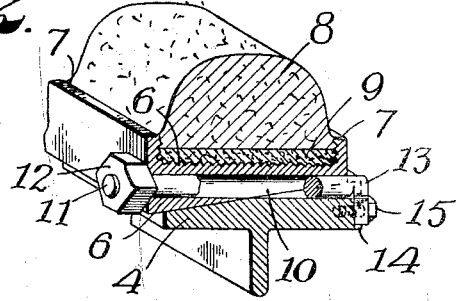
Fig. 2 is a transverse section on the plane of the broken line 2—2, Fig. 1, showing the metal felly-rim and demountable tire rim, with a solid cushion tire carried thereby.
Figure 3:
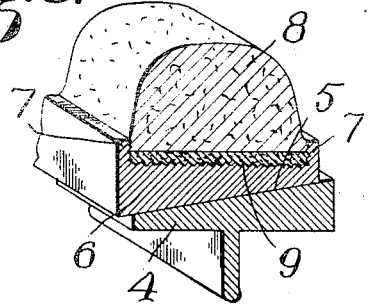
Fig. 3 is a transverse sectional view showing the same parts as illustrated in Fig. 2, but with the section on the plane of the broken line 3—3, Fig. 1.
Figure 5:
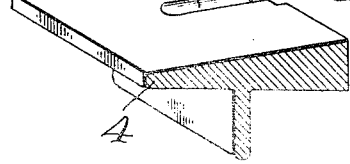
Fig. 5 is a transverse sectional view of a portion of the felly-rim, the demountable rim having been removed.
Figure 4:
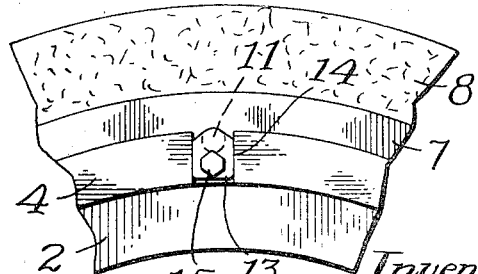
Fig. 4 is an enlarged side view of a portion of the rim showing the method of securing the attaching bolts thereto.

Referring to the accompanying drawings, 1, Fig. 1, is a side view of a vehicle wheel having felly 2 mounted upon the ends of radial spokes 3 in the usual manner of constructing wooden vehicle wheels. Supported upon the felly 2 is a felly-rim 4 made of metal and having its outer surface 5 beveled to form a seat for an annular demountable tire rim 6 having its interior surface beveled to fit the beveled periphery of the felly-rim 4. The demountable rim 6 is suitably constructed to support the type of tire desired, consisting in the present instance of a solid rubber cushion tire 8 held between flanges 7, 7, at opposite edges of the demountable rim. The tire 8, in the present instance is cemented by some suitable attaching material 9 to the outer surface of the demountable rim and is retained between the flanges 7, 7. Passing transversely through the demountable rim 6 are holes 10 to receive the bolts 11 which are screw threaded at one end and provided with nuts 12. The opposite ends of the bolts 11 are provided with heads 13 extending upon one side of the bolts and overlapping the edge of the felly-rim 4, to which it is attached by screws 15. The rotation of the head 13 about the screw 15 is prevented by inserting the heads 13 in recesses 14 formed in the edge of the felly-rim 4. The felly-rim 4 is provided with grooves 16, Fig. 5, through which the bolts 11 extend and thereby hold the tire rim from rotation upon the felly-rim.

The demountable rim 6 may be quickly removed by withdrawing the nuts 12 and withdrawing the rim from the bolts 11. To replace the demountable rim 6 it is turned until the holes 10 are brought into registration with the bolts 11, when the rim 6 is pushed laterally upon the bolts 11 which have been held in position by the screws 15 and the engagement of their heads 13 with the recesses 14 formed in the edge of the felly-rim. The nuts 12 are then applied to the bolts 11 and screwed thereon until the beveled surface of the tire rim 6 is seated firmly upon the beveled periphery 5 of the felly rim 4. The bolts 11 are long enough to allow the nuts 12 to be caught thereon by hand when the demountable rim 6 has been placed in position. The nuts 12 are then successively and gradually brought against the edge of the tire rim 6, causing the latter to be forced uniformly against the beveled surface 5 of the felly-rim.

The nuts 12 are therefore the only pieces of the entire structure which require to be detached in order to change the demountable rim and as the bolts 11 are equally spaced about the rim half a dozen nuts are usually sufficient to securely hold the demountable rim in place. In case the screw threads of the bolts 11 become defaced the bolts may be readily removed by withdrawing the screws 15.

The bolts 11 are held from rotating axially by means of the unilateral heads 13 held from turning in the recesses 14 of the felly rim. They are further held in a position transverse to the felly rim and in alinement with the holes 10 of the demountable rim 6 by means of the grooves 16 of the felly rim, and the screws 15 hold the bolts 11 from longitudinal movement during the replacement of the demountable rim.

I claim,

1. In a demountable rim for vehicles, the combination with a beveled felly rim having a series of spaced transverse grooves extending from one edge partially across its periphery and having radial recesses in said edge, communicating with said grooves, a series of straight bolts resting in said grooves and provided with unilateral heads fitting said recesses, a tire rim fitting the beveled surface of said felly rim and provided with transverse holes extending partially through said tire rim and in alinement with the grooves in said felly rim, nuts carried by said bolts, and means for holding said bolts from longitudinal movement.

2. In a demountable rim for vehicles, the combination with a beveled felly rim having a series of spaced transverse grooves extending from one edge partially across its periphery and having radial recesses in said edge communicating with said grooves, of a tire rim fitting the beveled surface of said felly rim and provided with transverse holes extending partially through the tire rim and in alinement with the grooves in the felly rim, a series of straight bolts resting in the grooves of the felly rim and provided with unilateral heads fitting said recesses, and nuts carried by said bolts and bearing against said tire rim.

3. In a demountable rim for vehicles, the combination with a beveled felly rim having a series of spaced transverse grooves extending from one edge partially across its periphery, of a series of straight bolts resting in said grooves, elongated unilateral heads on one end of said bolts, means for attaching said heads to the side of the felly rim, with the opposite ends of the bolts spaced from the felly rim, a tire rim held on said bolts having its inner surface fitting the beveled surface of the felly rim, and nuts carried on the free ends of said bolts and bearing against the edge of the tire rim.

RALPH L. MORGAN.

Witnesses:
 RUFUS B. FOWLER,
 PENELOPE COMBERBACH.